United States Patent
Kou

(10) Patent No.: US 8,913,218 B2
(45) Date of Patent: Dec. 16, 2014

(54) METHOD FOR FORMING REFLECTOR AND REFLECTIVE LIQUID CRYSTAL DISPLAY MANUFACTURED WITH SAME

(75) Inventor: Hao Kou, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 246 days.

(21) Appl. No.: 13/512,886

(22) PCT Filed: Apr. 25, 2012

(86) PCT No.: PCT/CN2012/074626
§ 371 (c)(1),
(2), (4) Date: May 30, 2012

(87) PCT Pub. No.: WO2013/152529
PCT Pub. Date: Oct. 17, 2013

(65) Prior Publication Data
US 2013/0271711 A1 Oct. 17, 2013

(30) Foreign Application Priority Data

Apr. 13, 2012 (CN) .......................... 2012 1 0112244

(51) Int. Cl.
*G02F 1/1335* (2006.01)
(52) U.S. Cl.
USPC .................. 349/113; 427/162; 427/163.4
(58) Field of Classification Search
USPC .............................. 349/113; 427/162, 163.4
See application file for complete search history.

(56) References Cited

U.S. PATENT DOCUMENTS

| 4,379,184 A * | 4/1983 | Tsvetkov et al. ............. 427/169 |
| 2010/0026943 A1 * | 2/2010 | Jagt et al. ...................... 349/115 |
| 2011/0280622 A1 * | 11/2011 | Fuchigami .................... 399/111 |

FOREIGN PATENT DOCUMENTS

| CN | 1232937 A | 10/1999 |
| CN | 1540407 A | 10/2004 |
| CN | 1817979 A | 8/2006 |
| CN | 101313416 A | 11/2008 |
| GB | 1511586 A * | 5/1978 |

* cited by examiner

*Primary Examiner* — Michael Caley
(74) *Attorney, Agent, or Firm* — Cheng-Ju Chiang

(57) ABSTRACT

The present invention provides a method for forming a reflector and a reflective LCD manufactured with the method. The method for forming reflector includes (1) providing metal powder and gold varnish, the metal powder being one or more than one selected from aluminum powder, copper powder, zinc powder; (2) mixing the metal powder and the gold varnish to form slurry; (3) providing a substrate and coating or printing the slurry on the substrate; and (4) baking the substrate on which the slurry coated or printed at a temperature of 60-80° C. for a period of 3-5 minutes to have the slurry forming a reflector on the substrate. The present invention forms a reflector on a substrate by mixing metal powder and gold varnish together to form slurry so as to improve homogeneity of scattered reflection of light by the reflector so formed.

7 Claims, 2 Drawing Sheets

METHOD FOR FORMING REFLECTOR AND REFLECTIVE LIQUID CRYSTAL DISPLAY MANUFACTURED WITH SAME

BACKGROUND OF THE INVENTION

1. Field of the Invention

The present invention relates to the field of liquid crystal displaying, and in particular to a method for forming a reflector and a reflective liquid crystal display (LCD) manufactured with the method.

2. The Related Arts

The displays that are currently available in the market are generally classified in three categories, namely transmissive LCD, reflective LCD, and transflective LCD, according to the liquid source used thereby. The transmissive LCD is fit for environments with weak lighting, such as being used indoors. For use outdoors, when an external light source is intense, the intensity of the backlight source is generally affected by the external lighting, making the eyes of a viewer, when watching the display panel, perceiving the display panel being excessively bright and thus not clear. This affects the image quality. Further, long term use of the backlight source generally consumes a great amount of electrical power. For small-sized displays, which are generally powered by batteries or cells, they often run out of power very quickly. The reflective LCD is fit for sites where strong external lighting exists, because a reflector is provided in the structure thereof to reflect the strong external light and thus alleviate the influence caused by the external lighting. Such a structure is thin and compact and consumes less power. However, insufficiency of light intensity may occur in sites where lighting is weak, thus affecting the image quality. Since the reflective LCD is advantageous for thin and compact structure and saving power, it is widely applied to portable liquid crystal displays. The transflective LCD has two different displaying modes. In a dark environment, the transmissive mode works, namely a backlight source of the LCD emitting light to transmit through a liquid crystal panel to display image, and in an environment of sufficient lighting, such as sunlight, the reflective mode works, namely a reflector inside the liquid crystal panel reflecting the external light to serve as a light source for displaying of image. Thus, the transflective LCD is fit for various external environments with different lighting intensities and is especially advantageous of having excellent outdoor viewability and requiring no great brightness of the backlight source and consuming less power.

A reflective LCD comprises an upper substrate, a lower substrate attached to the upper substrate, and liquid crystal interposed between the upper substrate and the lower substrate. A reflector is arranged on the lower substrate.

However, the reflection surface of a regular reflector is quite flat so that a portion of light that does not pass through and is thus not refracted by the upper substrate reaches and is thus directly reflected by the reflector of the lower substrate, while the remaining light passes through and is refracted by the upper substrate to enter the lower substrate and is subjected to reflection at the reflector of the lower substrate and then passes through and is refracted again by the upper substrate to leave the upper substrate. The two portions of light are of the same angle and thus interference results. This directly affects parameters of reflective LCD, such as the contrast and sharpness.

Based on the above described problems, the conventional reflective LCD often provides a tilt angle on the reflector of the lower substrate in order to induce scattered reflection to alleviate such an influence. However, this solution suffers the following issues:

(1) Masking operation and yellow light process must be used and the installation and labor costs are high;

(2) Layout must be effected on mask in forming the tilt angle and the quantity and direction of the tilt angle are fixed so that the scattered reflection induced thereby is only effective in a limited area and in an actual operation, mirror reflection may be linearly generated in localized areas; and (3) Techniques related to gray tone mask and half tone mask that shows variable local exposures must be adopted and the manufacture cost and yield control cost of these techniques are relatively high.

SUMMARY OF THE INVENTION

An object of the present invention is to provide a method for forming a reflector, which uses metal powder and gold varnish as raw materials to improve the homogeneity of scattered reflection of light of a reflector made thereby, and simplify the manufacture process and reduce the manufacture cost.

Another object of the present invention is to provide a reflective liquid crystal display (LCD) that is manufactured with the above described method, wherein a reflector is formed of metal powder so as to improve homogeneity of scattered reflection of light by the reflector and thus improve the contrast and sharpness of the display and the manufacture process is simple and the cost is low.

To achieve the objects, the present invention provides a method for forming a reflector, which comprises the following steps:

Step 1: providing metal powder and gold varnish, the metal powder being one or more than one selected from aluminum powder, copper powder, zinc powder;

Step 2: mixing the metal powder and the gold varnish to form slurry;

Step 3: providing a substrate and coating or printing the slurry on the substrate; and Step 4: baking the substrate on which the slurry coated or printed at a temperature of 60-80° C. for a period of 3-5 minutes to have the slurry forming a reflector on the substrate.

The metal powder is flake-like or sphere-like metal powder having a particle size of 0.3-1.2 μm.

After mixing, content ratio of the metal powder and the gold varnish is 2-3:7-8.

The reflector has surface roughness of 3.0-15.0 nm.

The present invention also provides a reflective liquid crystal display, which comprises an upper substrate and a lower substrate that are arranged to oppose and parallel to each other and liquid crystal interposed between the upper substrate and the lower substrate. The surface of the lower substrate that opposes the liquid crystal forms a reflector. The reflector is formed by coating or printing slurry on the lower substrate, followed by baking. The composition of the slurry comprises metal powder and a gold varnish. The metal powder is one or more than one selected from aluminum powder, copper powder, and zinc powder.

The metal powder is flake-like or sphere-like metal powder having a particle size of 0.3-1.2 μm.

After mixing, content ratio of the metal powder and the gold varnish is 2-3:7-8.

The reflector has surface roughness of 3.0-15.0 nm.

The efficacy of the present invention is that the present invention provides a method for forming reflector, which mixes metal powder and gold varnish together to form slurry and applies coating/printing operations to form a reflector on a substrate so as to improve homogeneity of scattered reflection of light by the reflector thereby eliminating the problem of increased cost caused by multiple masking operations and yellow light process used in the known techniques, simplifying the manufacture process, and also improving yield rate of product. The present invention provides a reflective LCD, which comprises a lower substrate on which a reflector is formed with the above described method so that light entering from an upper substrate is subjected to sufficient scattered reflection on the reflection surface of the reflector to make luminous intensity of the reflective LCD at various angles homogeneous. Further, when light is refracted again to leave the upper substrate, the chance that the light is of the same direction as the light that is only reflected by the surface of the upper substrate is greatly reduced so as to improve the contrast and sharpness of the reflective LCD, and also simplify the manufacture process and reduce the manufacture cost.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
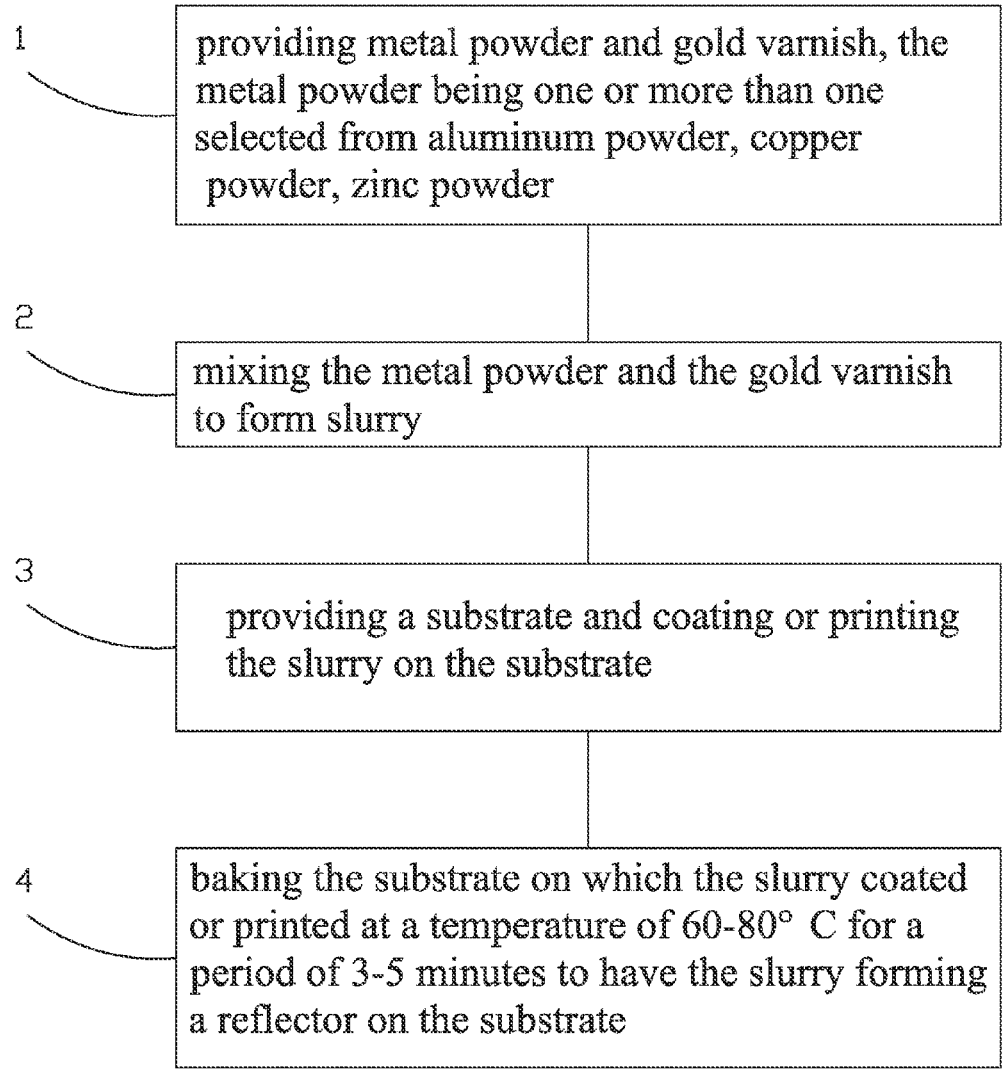
FIG. 1 is a flow chart illustrating a method for forming a reflector according to the present invention.

Referring to FIG. 1, the present invention provides a method for forming a reflector, comprising the following steps:

Step 1: providing metal powder and a gold varnish, in which the metal powder is flake-like or sphere-like metal powder having a particle size of 0.3-1.2 μm and the metal powder is one or more than one selected from aluminum powder, copper powder, and zinc powder;

Step 2: mixing the metal powder and the gold varnish with a predetermined ratio to form slurry, in which after mixing, the content ratio of the metal powder and the gold varnish is 2-3:7-8 and adjustment can be made by adding a proper amount of solvent to obtain a desired viscosity for the slurry;

Step 3: providing a substrate and applying coating/printing techniques to coat or print the slurry on the substrate; and Step 4: placing the substrate on which the slurry is coated or printed in a baking oven for baking in a temperature of 60-80° C. for a period of 3-5 minutes to remove organic components from the gold varnish to have the metal powder densely arranged and showing sufficient viscosity and making the metal powder exhibiting high reflectivity, whereby the slurry forms a reflector on the substrate, in which the reflector is a reflector and the reflector shows surface roughness of 3.0-15.0 nm, the roughness being controllable by adjusting the particle size of the metal powder and dilution ratio of the gold varnish.

In the forming method according to the present invention, for a reflector that is formed by using flake-like metal powder, the metal powder exhibits mirror reflection in a relatively small area and scattered reflection is caused at an interface area between two pieces of the metal powder due to relative positional difference, tilt angle of film formation, and different directional angles of printing. For a reflector formed by using sphere-like metal powder, due to the particle size being distributed in a given range, light is subjected to scattered reflection on the surface of the sphere and is further subjected to repeated reflection by upper and lower spheres of metal powder. Thus, the reflector that is formed of metal powder provides increased homogeneity and high reflectivity of scattered reflection of light.

Figure 2:
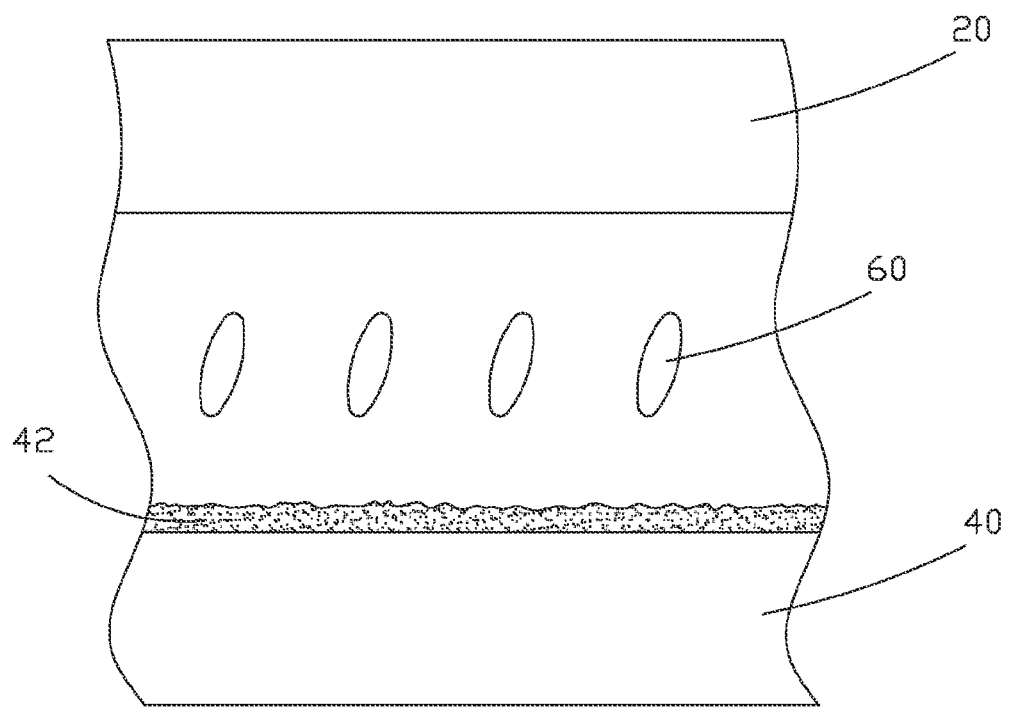
FIG. 2 is a schematic view showing a cross-sectional structure of a reflective liquid crystal display according to the present invention.

Referring to FIG. 2, the present invention also provides a reflective LCD (Liquid Crystal Display), which comprises an upper substrate 20 and a lower substrate 40 that are arranged to oppose and parallel to each other and liquid crystal 60 interposed between the upper substrate 20 and the lower substrate 40. The surface of the lower substrate 40 that opposes the liquid crystal forms a reflector 42. The reflector 42 is manufactured with the above described method. The reflector 42 is formed by coating or printing slurry on the lower substrate, followed by baking. The composition of the slurry comprises metal powder and a gold varnish, and the content ratio of the metal powder and the gold varnish in the mixture thereof is 2-3:7-8. The metal powder is flake-like or sphere-like metal powder having a particle size of 0.3-1.2 μm and the metal powder is one or more than one selected from aluminum powder, copper powder, and zinc powder. The reflector 42 has surface roughness of 3.0-15.0 nm and the roughness is controllable by adjusting the particle size of the metal powder and dilution ratio of the gold varnish.

In the reflector 42 formed of metal powder, the metal powder is densely arranged and shows sufficient viscosity, making the metal powder exhibiting high reflectivity, so that light entering from the upper substrate 20 is subjected to sufficient scattered reflection on the reflector 42 to make luminous intensity of the reflective LCD at various angles homogeneous. Further, when light is refracted again to leave the upper substrate 20, the chance that the light is of the same direction as the light that is only reflected by the surface of the upper substrate 20 is greatly reduced so as to improve the contrast and sharpness of the reflective LCD.

Further description will be made based on the following examples.

Example 1

Flake-like metal powder having a particle size of 0.4-0.8 μm is provided and mixed with gold varnish at a content ratio of 2.2-2.8:7.8-7.2 and is sufficiently stirred and then further added with a predetermined amount of solvent to reach a desired viscosity to be afterwards placed, together with a substrate, into a printing machine. After printing, baking is performed by being deposited in a baking oven at a temperature of 60° C. for a period of 3 minutes in order to volatilize the organic components of the gold varnish, making the metal powder densely arranged and showing sufficient viscosity and making the metal powder exhibiting high reflectivity thereby completing a reflector having reflection surface roughness (Sq, square root height) of 3.0-15.0 nm, which exhibits excellent result of scattered reflection and has excellent adhesion to the substrate for easy performance of the sequential operations to obtain a reflective LCD. The flake-like metal powder of the reflector exhibits mirror reflection in a relatively small area and scattered reflection is caused at an interface area between two pieces of the metal powder due to relative positional difference, tilt angle of film formation, and different directional angles of printing, so as to make luminous intensity of the reflective LCD at various angles homogeneous. Further, when light is refracted again to leave an upper substrate, the chance that the light is of the same direction as the light that is only reflected by the surface of the upper substrate is greatly reduced so as to improve the contrast and sharpness of the reflective LCD.

Example 2

Sphere-like metal powder having a particle size of 0.3-1.2 µm is provided and mixed with gold varnish at a content ratio of 2-3:7-8 and is sufficiently stirred and then further added with a predetermined amount of solvent to reach a desired viscosity to be afterwards placed, together with a substrate, into a printing machine. Then, baking is performed by being deposited in a baking oven at a temperature of 70° C. for a period of 3 minutes in order to volatilize the organic components of the gold varnish, making the metal powder densely arranged and showing sufficient viscosity and making the metal powder exhibiting high reflectivity thereby completing a reflector having reflection surface roughness of 5.0-12.5 nm, which exhibits excellent result of scattered reflection and has excellent adhesion to the substrate for easy performance of the sequential operations to obtain a reflective LCD. The sphere-like metal powder of the reflector has particle size distributed in a predetermined range, whereby light is subjected to scattered reflection on the surface of the sphere and is further subjected to repeated reflection by upper and lower spheres so as to make luminous intensity of the reflective LCD at various angles homogeneous. Further, when light is refracted again to leave an upper substrate, the chance that the light is of the same direction as the light that is only reflected by the surface of the upper substrate is greatly reduced so as to improve the contrast and sharpness of the reflective LCD.

In summary, the present invention forms a reflector on a substrate by mixing metal powder and gold varnish together to form slurry so as to improve homogeneity of scattered reflection of light by the reflector so formed thereby eliminating the problem of increased cost caused by multiple masking operations and yellow light process used in the known techniques, simplifying the manufacture process, and also improving yield rate of product. The present invention provides a reflective LCD, which comprises a lower substrate on which a reflector is formed with the above described method so that light entering from an upper substrate is subjected to sufficient scattered reflection on the reflection surface of the reflector to make luminous intensity of the reflective LCD at various angles homogeneous. Further, when light is refracted again to leave the upper substrate, the chance that the light is of the same direction as the light that is only reflected by the surface of the upper substrate is greatly reduced so as to improve the contrast and sharpness of the reflective LCD, and also simplify the manufacture process and reduce the manufacture cost.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for forming a reflector, comprising the following steps:
    Step 1: providing metal powder and gold varnish, the metal powder being one or more than one selected from aluminum powder, copper powder, zinc powder having a particle size of 0.3-1.2 µm;
    Step 2: mixing the metal powder and the gold varnish to form slurry in such a way that content ratio of the metal powder and the gold varnish is 2-3:7-8;
    Step 3: providing a substrate and coating or printing the slurry on the substrate; and
    Step 4: baking the substrate on which the slurry coated or printed at a temperature of 60-80° C. for a period of 3-5 minutes to have the slurry forming a reflector on the substrate.

2. The method for forming a reflector as claimed in claim 1, wherein the metal powder is flake-like or sphere-like metal powder.

3. The method for forming a reflector as claimed in claim 1, wherein the reflector has surface roughness of 3.0-15.0 nm.

4. A reflective liquid crystal display, comprising an upper substrate and a lower substrate that are arranged to oppose and parallel to each other and liquid crystal interposed between the upper substrate and the lower substrate, a surface of the lower substrate that opposes the liquid crystal forming a reflector, the reflector being formed by coating or printing slurry on the lower substrate, followed by baking, composition of the slurry comprising metal powder and a gold varnish that are mixed together in such a way that content ratio of the metal powder and the gold varnish is 2-3:7-8, the metal powder being one or more than one selected from aluminum powder, copper powder, and zinc powder having a particle size of 0.3-1.2 µm.

5. The reflective liquid crystal display as claimed in claim 4, wherein the metal powder is flake-like or sphere-like metal powder.

6. The reflective liquid crystal display as claimed in claim 4, wherein the reflector has surface roughness of 3.0-15.0 nm.

7. A reflective liquid crystal display, comprising an upper substrate and a lower substrate that are arranged to oppose and parallel to each other and liquid crystal interposed between the upper substrate and the lower substrate, a surface of the lower substrate that opposes the liquid crystal forming a reflector, the reflector being formed by coating or printing slurry on the lower substrate, followed by baking, composition of the slurry comprising metal powder and a gold varnish that are mixed together in such a way that content ratio of the metal powder and the gold varnish is 2-3:7-8, the metal powder being one or more than one selected from aluminum powder, copper powder, and zinc powder having a particle size of 0.3-1.2 µm;
    wherein the metal powder is flake-like or sphere-like metal powder; and
    wherein the reflector has surface roughness of 3.0-15.0 nm.

* * * * *